Jan. 12, 1954  D. MacGREGOR  2,665,875
VALVE CONSTRUCTION
Filed April 15, 1946  2 Sheets-Sheet 1

Inventor
David MacGregor

By Strauch & Hoffman
Attorneys

Jan. 12, 1954  D. MacGREGOR  2,665,875
VALVE CONSTRUCTION
Filed April 15, 1946  2 Sheets-Sheet 2
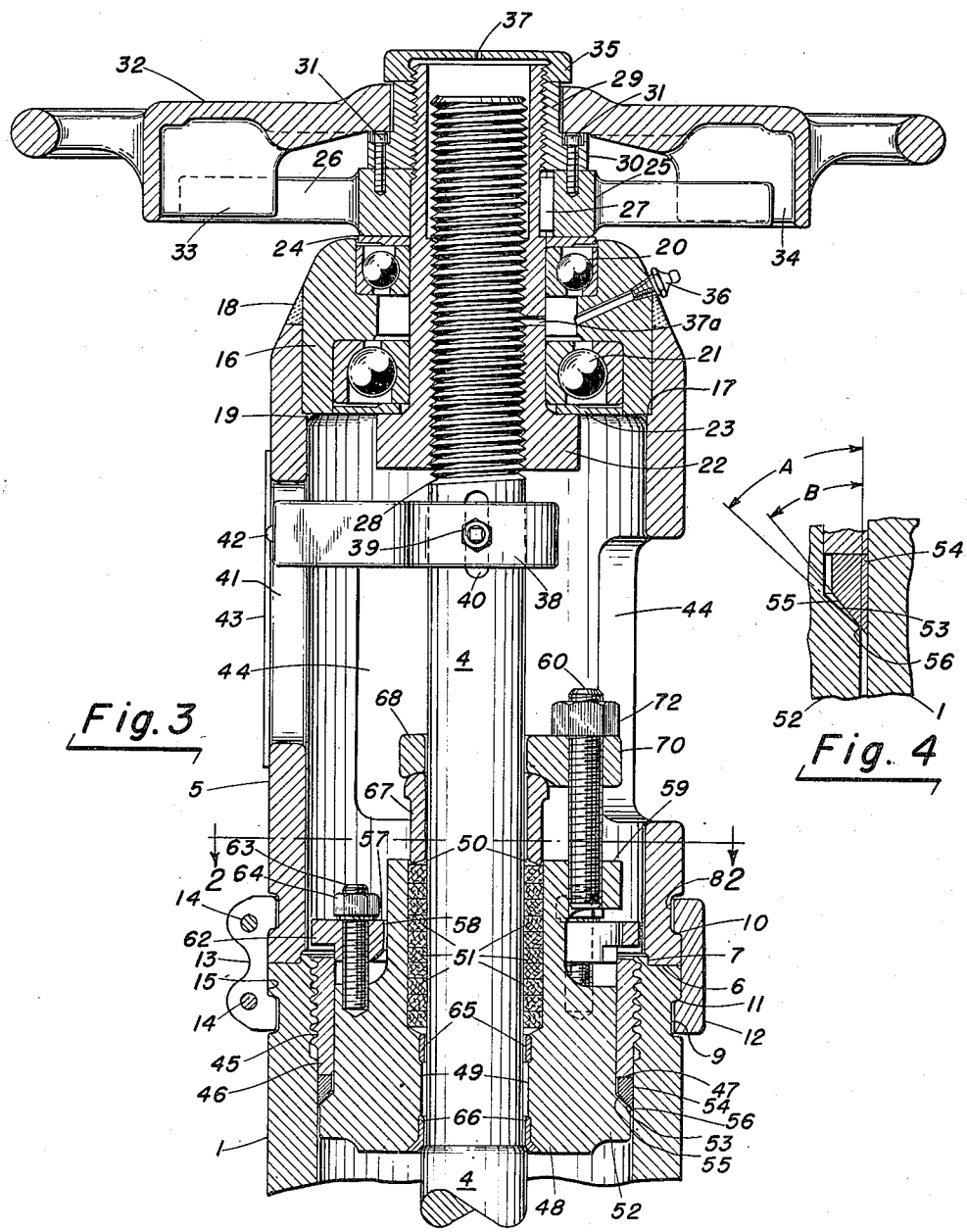
Inventor
David MacGregor
By Strauch & Hoffman
Attorneys Patented Jan. 12, 1954

2,665,875

UNITED STATES PATENT OFFICE 2,665,875

VALVE CONSTRUCTION

David MacGregor, Munster, Ind., assignor to Edward Valves Incorporated, East Chicago, Ind., a corporation of Indiana Application April 15, 1946, Serial No. 662,341

3 Claims. (Cl. 251—49)

This invention relates to improved constructions in high pressure fluid control valves.

The provision of a satisfactory valve for control of the flow of high pressure and high temperature fluids such as steam is a difficult problem because of the many factors involved, especially when such valves are used to control the flow of large volumes of high pressure steam or the like, and when they are of large size and corresponding weight. It is frequently difficult to seal these valves against leaks because of the coefficients of expansion of the metal in the valve structure and the fact that all of the parts of the valve are not simultaneously heated to the same temperature. It is also desirable to provide for disassembly of the valves with as little work as possible in order to repair them when necessary. For this reason it is not desirable to construct them as one piece or of welded construction for the purpose of preventing leakage. By means of the construction disclosed herein, I have provided an improved high pressure valve structure which is easily disassembled and is completely and effectively sealed against leakage of the fluid or the loss of pressure through the sliding connections which are necessary in order to shut the valve by means of exterior devices such as handwheels, etc.

My valve also provides significant improvements over the type shown in the Patent 2,321,597, issued June 15, 1943, to James C. Hobbs, wherein the valve stem is journalled at its upper end in a yoke carried on a seal sleeve threaded in the valve body. Such a structure offers opportunity for misalignment, as the seal parts yield under pressure, whereas there is no such opportunity in the structure of my improved valve wherein the yoke guiding the upper end of the valve stem is rigidly fastened in accurate alignment with the valve body and valve sealing surfaces with a minimum of disturbance due to the floating action of the seal parts under operating pressure variations.

It is therefore the primary object of my invention to provide a novel and improved valve for the control of high pressure fluids.

It is another important object of my invention to provide novel and improved pressure sealing means in a high pressure valve construction.

Another object of my invention is the provision of an improved sealing means which will be effective in spite of fluctuations in temperature or variations in manufacturing tolerances, etc.

It is another object of my invention to provide a novel and improved assembly between a valve body and the yoke of the valve stem and which is effectively sealed against pressure losses.

Another object of my invention is the provision of a novel and improved sealing means between two normally relatively stationary surfaces.

Another object is the provision of a novel and improved pressure sealing device between two surfaces wherein the seal becomes more effective with increasing pressure of the fluid which is retained by the seal.

Another important object is the provision of a novel and improved valve construction wherein the valve stem is accurately supported with relation to the valve body and is guided within the body by pressure sealing devices which are shiftable or float a limited amount with pressure and temperature changes without substantially affecting the alignment of the stem.

Other objects will become apparent as the description proceeds with the accompanying drawings, wherein:

Figure 3 is an enlarged vertical sectional view of the upper part of Figure 1, taken substantially along the line 3—3 of Figure 2;

Figure 4 is a greatly enlarged sectional view of a portion of Figure 3, to more adequately show the pressure seal.

Figures 1, 2:
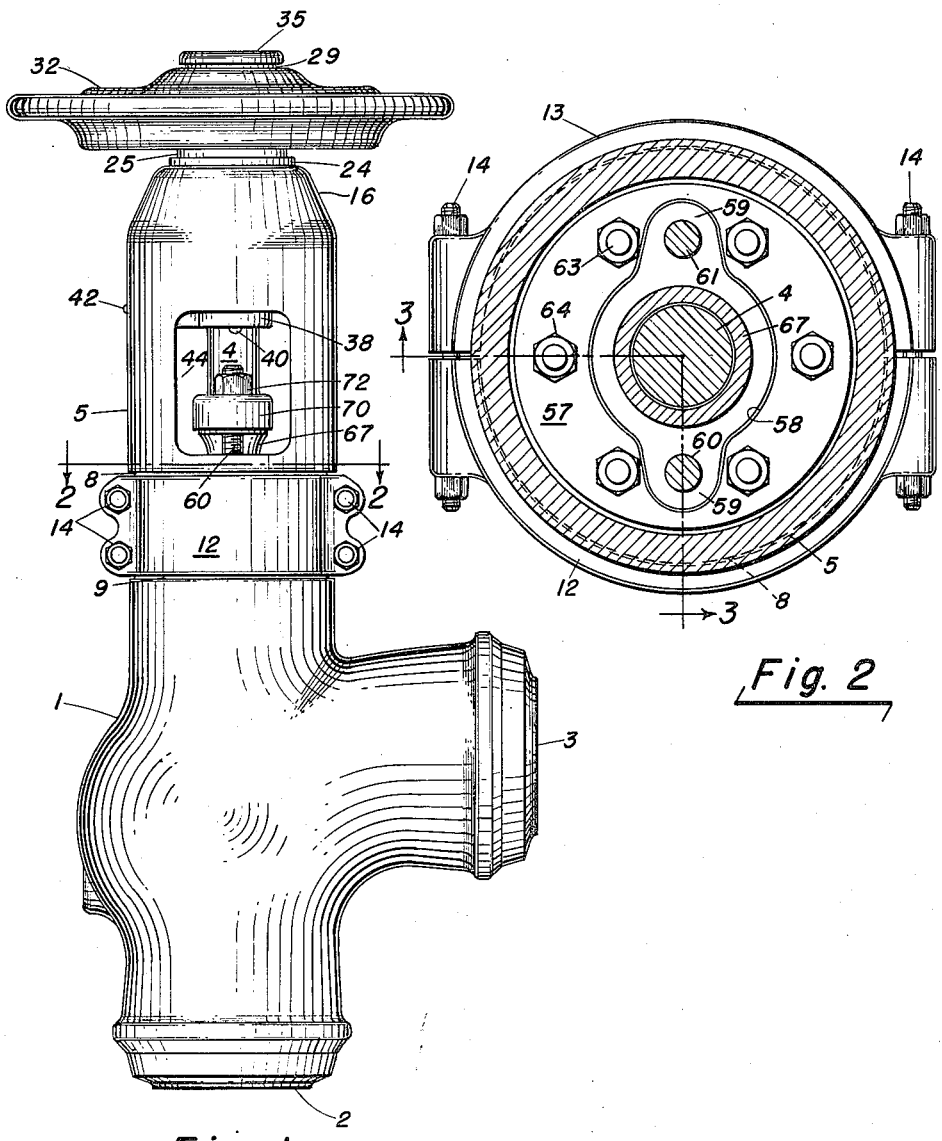
Figure 1 is a view in side elevation of a high pressure steam valve which embodies my improvements.
Figure 2 is an enlarged horizontal section taken substantially along the lines 2—2 of Figures 1 and 3.

My invention is illustrated as being applied to an angle type non-return valve as illustrated in Figure 1, wherein a valve body 1 has an inlet 2 and an outlet 3 for high pressure steam or the like. The flow of steam is cut off or controlled in volume by means of a valve disc (not shown) which is raised or permitted to rise from its seat (not shown) in the body by upward movement of stem 4, or closed against its seat by the downward movement of the stem 4. The details of the valve disc and seat and the other internal construction of the lower part of the valve body 1 do not form any part of this invention and may be of any well known form. While an angle type body is illustrated in Figure 1, it is to be understood that the body may also be of the globe type, wherein the inlet 2 is substantially coaxial with the outlet 3. In the particular valve illustrated, which is of the non-return type, the valve disc within the body 1 is adapted to be automatically forced against its seat by fluid flow in the reverse direction, without movement of the stem 4.

A yoke 5 which is tubular and coaxial with the tubular upper portion of the body 1 is seated upon the upper edge of the body 1 as shown in Figure 3. The top edge of the body 1 is provided with a wide peripheral recess 6 to form an annular shoulder 7 which provides means to pilot the yoke 5 to insure accurate alignment of the bottom of the yoke with the seat formed by the recess 6. Adjacent its bottom end the yoke 5 has a peripheral groove 8. The body 1 is provided with a similar peripheral groove 9, the grooves 8 and 9 being parallel to each other and to the seat formed by the recess 6. The lower wall 10 of the recess 8 and the upper wall 11 of the recess 9 are inclined toward each other as shown in Figure 3 to provide camming seats for engagement by a split yoke lock ring formed of two similar parts 12 and 13. The two parts 12 and 13 of the yoke lock ring are clamped together and around the joint between the body 1 and the yoke 5 by means of two diametrically spaced pairs of bolts 14. As shown in Figure 3, the assembled yoke lock ring has an inner groove 15 extending around its inner circumference. The upper and lower walls of the groove 15 are inclined so that they are parallel with the inclined walls 10 and 11. The distance between the inclined walls of the groove 15 is such that as the yoke lock ring comprising the parts 12 and 13 is assembled and clamped to the body 1 and yoke 5 at their joint, the inclined walls of the groove 15 will wedge the body 1 and the yoke 5 tightly and accurately together by engaging the inclined walls 10 and 11.

The upper and open end of the yoke 5 is closed by a ring 16 which is seated on an internal shoulder 17 in the yoke 5 and welded into an integrated structure by welds 18 and 19. The ring 16 has internal bores providing seats for a pair of spaced bearings 20 and 21 which journal a yoke bushing 22 for rotation. A bearing washer 23 is clamped between a flange on the yoke bushing 22 and the inner race of the lower bearing 21. A similar bearing washer 24 is clamped against the top of the inner race of the bearing 20 by the hub 25 of a cross arm 26. The cross arm 26 is secured to and keyed to the yoke bushing 22 by a cross arm key 27, so that rotation of the cross arm 26 will rotate the yoke bushing 22 which is internally threaded to receive the upper end of the valve stem 4 and its mating thread 28. The upper end of the yoke bushing 22 also has exterior threads engaging a sleeve 29, which has a horizontal flange 30. The sleeve 29, when tight, clamps the bearings 20 and 21 and the cross arm 26, together with the bearing washers 23 and 24 against the flange on the bottom of the yoke bushing 22. The sleeve 29 is secured against rotation with respect to the cross arm 26 by screws 31 passing through its flange 30 and threaded into the hub 25 of the cross arm 26. An impactor type hand wheel has a central opening, rests on the flange 30, and is journalled for rotation about the bushing 29. On its under side the hand wheel 32 is provided with a pair of diametrically spaced internally projecting lugs 33 and 34 which engage the outer ends of the diametrically spaced arms of the cross arm 26. A hand wheel cap 35 is threaded to the top of the yoke bushing 22 to close the upper end of the bushing and to retain the hand wheel on its bushing 29.

The hand wheel is thus allowed to spin freely about the bushing 29. After a half turn, however, the lugs 33 and 34 engage the arms of the cross arm 26, thus rotating the yoke bushing 22 and moving the valve stem 4 upwardly or downwardly as the case may be. The hand wheel may be given a quick spin so that it will impact the cross arm 26 by striking against its arms, whereby a larger amount of force is transmitted to the valve stem 4 than can ordinarily be applied by the application of a steady force to the hand wheel or to the cross arm 26. Lubricants for bearings 20 and 21 may be applied to a conventional fitting 36, and lubricants to the top or stem may be applied by an oil hole 37 in the top of the cap 35. The bearing lubricant may also reach the threaded valve stem through a passage 37a. The structure of the impactor type hand wheel and assembly described above does not form any part of this invention, since it is of the type shown in Patent 1,990,197, granted February 5, 1935, to Walter W. Mohr.

A valve stem guide collar 38 is fastened to the stem by a bolt 39 which passes through the collar and holds a key in a keyway 40 in the stem. One end of the collar 38 extends through a guide slot 41 in the wall of the yoke 5, the slot being elongated in a vertical direction and the walls of which are in sliding engagement with the sides of the collar 38. The collar 38, fastened to the stem 4 and having sliding engagement with the slot 41 thus prevents rotation of the valve stem 4 as the yoke bushing 22 is rotated. At its outer end the collar 38 has an index mark or pointer 42 which can be read against a scale 43 fastened to the yoke 5 alongside the slot 41. Since the collar 38 moves vertically with the valve stem 4, the position of the pointer 42 with respect to the scale 43 indicates the vertical position of the stem 4 and consequently the degree of valve opening. In the drawings the pointer is adjacent the upper end of scale 43, indicating substantially full valve opening. The engagement of bolt 39 with the key in the keyway 40 in the valve stem permits the guide collar 38 to be verticaly adjusted so that the index mark for pointer 42 will be at the zero position on the scale 43 when the stem 4 is at the bottom of its stroke and the valve is closed. Diametrically opposed openings 44 are provided in the yoke 5 to permit the insertion of tools for adjustment of the valve collar 38 and for the adjustment of the sealing parts of the valve which will now be described.

The upper end of the valve body 1 is provided with internal threads 45 for mating engagement with the external threads on a gasket retainer sleeve 46 which is preferably of stainless steel or other suitable corrosion-resistant metal, or metal with a corrosion-resistant coating. The threads 45 are shown as being of the knuckle or rounded type and are of heavy construction and relatively loose fitting. The bottom of the retainer 46 is flat and lies in a horizontal plane. Guided for vertical shifting movement within the gasket retainer 46 and the interior wall of the valve body 1 is a bonnet 48, having a central passage 49 for the stem 4 and an enlarged passage 50 to receive a stack of packing rings 51 or packing of any other suitable type.

The lower end of the bonnet 48 is enlarged by a flange 52 to restrain the bonnet against upward movement past the gasket retainer 46. An inclined wall 53 joins the outer wall of flange 52 to that portion of the bonnet which is received within the gasket retainer 46. A relatively soft sealing gasket 54 which may be of relatively pure soft iron, asbestos or the like, depending on the service for which the valve is used, is located between the retainer 46 and the inclined wall 53 on the bonnet. As best shown in the enlarged view of Figure 4, the gasket 54 has a hollow cylindrical portion, the bottom wall 55 of which inclines downwardly and outwardly. The bottom inclined wall 55 of the gasket makes a more acute angle with the vertical than does the inclined wall 53 of the bonnet. In the example shown, the angle made by the wall 55 is indicated at B and the angle of the wall 53 is indicated by A. Also, in the example shown, angle A is approximately 45° and angle B is approximately 44°, the difference between angle A and angle B being exaggerated in the drawing. The bonnet 48 has a sliding fit within the gasket retainer 46 and as shown, the flange 52 thereof is smaller in diameter than the interior bore of the valve body 1, so that there is a slight gap between the bore and the flange 52. It is thus apparent that upward movement of the bonnet 48 will cause the gasket 54 to be wedged outwardly against the bore within the valve body 1 and, as shown clearly in Figure 4, the thin bottom end of the gasket will be squeezed between the bore and the juncture of the wall 53 and the flange 52 at 56. As the upward force on the bonnet 48 is increased, as by steam pressure within the valve body and below the bonnet, it is apparent that the gasket will be compressed tighter between the bonnet and the bore, particularly at the juncture 56. Thus, as the bonnet is moved upwardly the sealing pressure on the gasket 54 is first applied at its most flexible end. In Figure 4 of the drawings the gasket 54 is shown substantially uncompressed in order to more clearly illustrate the angels A and B.

A bonnet retainer ring 57 has a central aperture 58 (best shown in Figure 2), so that it may be slipped over the upper end of the bonnet 48 and a pair of diametrically opposed projecting ears 59 thereon, into which are threaded a pair of vertical studs 60 and 61.

The lower end of the retainer ring 57 is recessed so as to fit within the gasket retainer 46, thus forming a peripheral shoulder 62. A series of substantially equiangularly spaced studs 63 are threaded into the top of the bonnet 48 and pass through the retainer ring 57 to receive bonnet retainer nuts 64 at their upper ends. Nuts 64 are initially lightly tightened on the studs 63 against shoulder 62 of the retainer ring 57. When the operating pressures are exerted against bonnet 48, the bonnet moves upward to compress gasket 54 to form a pressure seal. When the full pressure of the fluid has been admitted to the valve body 1, as is the general condition when the valve is fully opened, the total force exerted on the bonnet 48 by the high pressure fluid is generally sufficient to cause the bonnet to be raised slightly, so that the shoulder 62 may raise from its seat upon the top of the gasket retainer 46. If the studs 63 have a sufficiently loose passage through the retainer ring 57, the ring may remain seated as the bolts 63 move upwardly under the influence of the steam pressure on the bonnet. In the drawings, since the gasket 54 is not shown compressed, the bonnet retainer ring is not shown fastened down and seated on the top of the sleeve 46.

By means of the above described sealing structure, the bonnet 48, the gasket retainer 46, the valve body 1, and the bonnet retainer ring 57 may have a rather loose fitting relationship to permit future disassembly after prolonged exposure to high temperature with subsequent oxidization and softening of the parts.

At the top and also at the bottom of the smaller passageway 49 in the bonnet 48 are a pair of bearings 65 and 66 which provide guides for the valve stem where it passes through the bonnet. These bearings or guides 65 and 66 are preferably of a hard surfaced stainless steel alloy having a relatively low coefficient of friction with the surface of the valve stem 4. The bearings or guides 65 and 66 are screw-threaded or welded into grooves in the wall of the passageway 49 in the bonnet 48. The two bearings or guides 65 and 66 are located substantially equidistantly from a plane passing approximately centrally through the sealing contact area of gasket 54 in order to minimize the effect of any twisting of the bonnet 48 as the gasket 54 is forced to yield by the movement of the bonnet under the influence of the fluid pressure.

A tubular gland 67 has a sliding engagement over the valve stem 4 and within the enlarged passage 50 in the bonnet 48. The upper surface of the gland 67 is rounded to a substantially spherical shape for mating engagement with a spherical recess on the under side of a gland flange 68, which has a pair of diametrically opposed ears 70 through which pass the studs 60 and 61. Nuts 72 are tightened against the arm 70 in order to force the gland 67 downwardly to compress the packing rings 51 and seal the passageways 49 and 50 against the leakage of fluid therethrough. The mating spherical surfaces on the top of the gland 67 and the bottom of the gland flange 68 permits equal pressure distribution even if there is a slight misadjustment of the nuts 72. Access to the nuts 72 and 64 is gained by means of the diametrically opposed openings 44 through the wall of yoke 5 as explained previously.

By means of the flexible seal shown and described between the bonnet and the valve body the stresses in the wall of the valve body above the seal are substantially reduced, in the order of 50 per cent. In a similar manner, the stresses within the bonnet are reduced by a like amount. Since the stress in the bonnet above the seal is reduced to this extent, the thickness of the bonnet above the seal may be reduced to accommodate the gasket retainer 46 as shown. This permits the retention of substantially the full wall thickness of the valve body above the seal at the gasket 54 and permits the removal of the metal in the valve body to provide the groove 9 to receive the yoke lock nut ring parts 12 and 13, instead of requiring the thickening of the valve at these points, in order to use the groove.

The entire structure is lighter in weight than other previous valves for the same purpose, yet the seal is wholly effective and the structure is easily dismantled.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a valve structure, a hollow valve body having a fluid passage and a hollow extension provided with a straight walled cylindrical bore for receiving a bonnet, means forming an internal annular downwardly facing shoulder within said bore, an annular gasket having an outer peripheral surface parallel to and received within said bore having one face seated against said shoulder and having its opposite face inclined away from said shoulder and outwardly toward said bore at an acute angle thereto, a bonnet slidably fitted in said bore and having a central aperture and a reduced portion within said gasket terminating at its lower end in an outwardly flaring upwardly facing wall adapted to be forced into annular contact with said inclined face of said gasket, the angle between said bore and said inclined face of said gasket being smaller than the angle between said bore and the flaring wall of said bonnet, a pair of annular bearing means in said aperture for guiding a valve stem, said bearing means being spaced respectively, above and below said wall, sealing means within said aperture adapted to surround said valve stem, and means associated with said bonnet for compressing said sealing means.

2. In a high pressure valve having a body provided with a fluid passage and a bore having a cylindrical portion angularly related to said fluid passage; a closure slidably mounted in said cylindrical portion in said bore having an external downwardly and outwardly flaring wall inclined with respect to said bore, said closure having a lower surface exposed to the high pressure fluid; an annular sealing gasket positioned around said closure above said wall, said gasket having a lower face inclined at an acute angle to the bore, the angle between said lower face of the gasket and said bore being smaller than the angle between said wall and said bore; a gasket retainer in said bore providing an annular downwardly facing shoulder in said bore above the upper surface of said sealing gasket; cooperating means on said gasket retainer and said bore to relatively fix said retainer within said bore; a closure retainer positioned above said gasket retainer; means forming a downwardly facing annular shoulder on said closure retainer; means cooperating with said shoulder on said closure retainer for limiting downward movement of said closure retainer while permitting the free upward movement of said closure; a plurality of studs attached to said closure and extending freely upwardly through said closure retainer inwardly of said gasket retainer; and a plurality of nuts on said studs above said closure retainer adapted, when tightened, to urge said closure upwardly towards said closure retainer to urge said closure wall against said lower inclined face of said gasket to deform the lower portion of said gasket into initial sealing contact with said bore over an area of substantial width, said closure being upwardly movable independently of said gasket retainer under the influence of pressure within said valve body acting on said lower surface of said closure to further compress said sealing gasket to increase the area of sealing contact with said bore.

3. In a high pressure valve having a body provided with a fluid passage and a straight walled smooth cylindrical bore; an annular bonnet slidably mounted in said bore having an external surface terminating at its lower end in a downwardly and outwardly flaring wall inclined with respect to said bore, said bonnet having a lower surface exposed to the high pressure fluid; an annular sealing gasket having an outer cylindrical surface telescoped around said bonnet above said wall, said gasket having its lower face inclined at an acute angle to the bore, the angle between said lower face of the gasket and said bore being smaller than the angle between said wall and said bore; a gasket retainer ring telescoped around said bonnet and screw threaded into said valve body and having a lower annular surface adapted to engage the upper surface of said sealing gasket, said gasket retainer ring being relatively fixed within said bore; a bonnet retainer ring independent of said gasket retainer ring and telescoped around a reduced section of said bonnet above said gasket retainer ring; means forming an annular downwardly facing shoulder on said bonnet retainer ring; means cooperating with said shoulder on said bonnet retainer ring for limiting downward movement of said bonnet retainer ring while permitting the free upward movement of said bonnet; a plurality of studs attached to said bonnet and extending freely upwardly through said bonnet retainer ring inwardly of said gasket retainer ring; and a plurality of nuts on said studs above said bonnet retainer ring adapted, when tightened, to urge said bonnet upwardly towards said bonnet retainer ring to initially compress said sealing gasket and deform the lower portion of said gasket outwardly into sealing contact with said bore over an area of substantial width, said bonnet and said bonnet retainer ring being upwardly movable independently of said gasket retainer ring under the influence of pressure within said valve body acting on said lower surface of said bonnet to further compress said sealing gasket and further deform said sealing gasket outwardly to increase the area of sealing contact with said bore.

DAVID MacGREGOR.

References Cited in the file of this patent

UNITED STATES PATENTS

| Number | Name | Date |
|---|---|---|
| 849,837 | Eggleston | Apr. 9, 1907 |
| 1,508,102 | Holt | Sept. 9, 1924 |
| 1,722,623 | Bramwell | July 30, 1929 |
| 1,863,122 | Matthews | June 14, 1932 |
| 1,863,712 | Byfield | June 21, 1932 |
| 2,092,182 | Ray | Sept. 7, 1937 |
| 2,305,589 | Stark | Dec. 22, 1942 |
| 2,305,590 | Marburg | Dec. 22, 1942 |
| 2,321,597 | Hobbs | June 15, 1943 |
| 2,396,469 | Meigs | Mar. 12, 1946 |
| 2,424,449 | Gasche | July 22, 1947 |
| 2,443,187 | Hobbs | June 15, 1948 |